US012218430B2

(12) United States Patent
Da Silveira et al.

(10) Patent No.: US 12,218,430 B2
(45) Date of Patent: Feb. 4, 2025

(54) INTEGRATED ANTENNA AND FILTER UNIT (IAFU) FOR 5TH GENERATION ADVANCED ANTENNA SYSTEM (AAS) SYSTEMS

(71) Applicant: Telefonaktiebolaget LM Ericsson (publ), Stockholm (SE)

(72) Inventors: Martin Da Silveira, Ottawa (CA); Neil McGowan, Stittsville (CA); Andrew McNair, Ottawa (CA); Weigang Zeng, Nepean (CA); Chunyun Jian, Ottawa (CA); Martin Ethier, Ottawa (CA); Francis Marion, Gatineau (CA); Zhen Hong Wang, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/495,206

(22) Filed: Oct. 26, 2023

(65) Prior Publication Data

US 2024/0088572 A1 Mar. 14, 2024

Related U.S. Application Data

(63) Continuation of application No. 17/599,144, filed as application No. PCT/IB2020/053456 on Apr. 10, 2020, now Pat. No. 11,837,789.

(Continued)

(51) Int. Cl.

*H01P 7/06* (2006.01)
*H01P 1/207* (2006.01)

(Continued)

(52) U.S. Cl.

CPC ........... *H01Q 21/061* (2013.01); *H01P 1/207* (2013.01); *H01P 1/213* (2013.01); *H01P 7/06* (2013.01);

(Continued)

(58) Field of Classification Search

CPC ............ H01Q 1/48; H01Q 1/50; H01Q 1/523; H01Q 1/526; H01Q 3/02-10; H01Q 3/32; H01P 7/06

See application file for complete search history.

(56) References Cited

U.S. PATENT DOCUMENTS 5,929,815 A * 7/1999 Elderfield .............. H01R 24/50 343/702
6,100,606 A * 8/2000 Nakahata ............... H01H 50/10 200/305

(Continued)

FOREIGN PATENT DOCUMENTS

CZ 2002108 A3 10/2002
EP 3361566 A1 8/2018

(Continued)

OTHER PUBLICATIONS

International Search Report and Written opinion dated Jun. 17, 2020 issued in PCT Application No. PCT/IB2020/053456, consisting of 13 pages.

(Continued)

*Primary Examiner* — Jason M Crawford
(74) *Attorney, Agent, or Firm* — Weisberg I.P. Law, P.A.

(57) ABSTRACT

According to one aspect, an integrated antenna and filter unit, IAFU, is provided. The IAFU includes a filter portion including at least one filter configured to filter RF signals to generate filtered RF signals and a plurality of filter pins configured to output filtered RF signals, and an antenna portion securable to the filter portion where the antenna portion includes a PCB including a plurality of conductor traces each mateable with a corresponding one of the plurality of filter pins to electrically couple the plurality of filter pins directly to corresponding ones of the plurality of conductor traces on the PCB, and a plurality of antennas (Continued)

securable to the PCB where the plurality of antennas are electrically coupled to the plurality of conductor traces.

18 Claims, 7 Drawing Sheets

Related U.S. Application Data

(60) Provisional application No. 62/833,987, filed on Apr. 15, 2019.

(51) Int. Cl.
*H01P 1/213* (2006.01)
*H01Q 1/24* (2006.01)
*H01Q 1/52* (2006.01)
*H01Q 3/26* (2006.01)
*H01Q 21/06* (2006.01)

(52) U.S. Cl.
CPC ............. *H01Q 1/246* (2013.01); *H01Q 1/523* (2013.01); *H01Q 1/526* (2013.01); *H01Q 3/267* (2013.01)

(56) References Cited

U.S. PATENT DOCUMENTS 6,329,949 B1 * 12/2001 Barnett .................. H01Q 23/00 343/702
6,717,398 B2 * 4/2004 Cartier ............... G01R 1/06772 324/95
10,923,830 B2 * 2/2021 Lin ........................ H01R 12/52
11,081,777 B2 * 8/2021 Kim ......................... H01Q 1/42
11,837,789 B2 * 12/2023 Da Silveira ............... H01P 7/06
2004/0106304 A1 * 6/2004 Lin ........................ H01R 24/50 439/63
2004/0202432 A1 * 10/2004 Baek .................... H05K 1/0243 385/88
2006/0208835 A1 * 9/2006 Lee ...................... H05K 1/0243 333/260
2010/0255688 A1 * 10/2010 Steinkamp ............. H01R 24/50 439/63
2012/0293279 A1 * 11/2012 Gong ....................... H01Q 9/32 333/202
2018/0048043 A1 * 2/2018 Park .......................... H01P 7/06
2019/0081407 A1 3/2019 Doudou et al.
2019/0207323 A1 * 7/2019 Joung .................... H01Q 1/523
2019/0268046 A1 * 8/2019 Kim ..................... H01Q 25/001
2019/0348734 A1 * 11/2019 Kim ....................... H01Q 1/241
2020/0028237 A1 * 1/2020 Kim ......................... H01Q 1/02
2020/0235488 A1 * 7/2020 Lin ...................... H01Q 21/293
2020/0313285 A1 * 10/2020 Chu ..................... H01Q 15/246
2021/0336659 A1 * 10/2021 Kim ....................... H01Q 21/29
2021/0359415 A1 * 11/2021 Takaki ................... H01Q 21/28
2022/0077586 A1 * 3/2022 Jeong ..................... H01Q 1/526
2022/0173526 A1 * 6/2022 Da Silveira ............ H01Q 3/267
2022/0294108 A1 * 9/2022 Zhang .................... H01Q 1/246
2024/0088572 A1 * 3/2024 Da Silveira ............ H01Q 1/523
2024/0145893 A1 * 5/2024 Lv ............................. H01P 7/06

FOREIGN PATENT DOCUMENTS

KR 20180089265 A 8/2018
WO 2019047091 A1 3/2019

OTHER PUBLICATIONS

Written Opinion of the International Preliminary Examining Authority dated Mar. 12, 2021 issued in PCT Application No. PCT/IB2020/053456, consisting of 7 pages.
International Preliminary Report on Patentability dated Jun. 16, 2021 issued in PCT Application No. PCT/IB2020/053456, consisting of 21 pages.

* cited by examiner

INTEGRATED ANTENNA AND FILTER UNIT (IAFU) FOR 5TH GENERATION ADVANCED ANTENNA SYSTEM (AAS) SYSTEMS

CROSS-REFERENCE TO RELATED APPLICATIONS

This application is a continuation of U.S. application Ser. No. 17/599,144, filed Sep. 28, 2021, entitled "INTEGRATED ANTENNA AND FILTER UNIT (IAFU) FOR 5th GENERATION ADVANCED ANTENNA SYSTEM (AAS) SYSTEMS", which claims priority to International Application No. PCT/IB2020/053456, filed Apr. 10, 2020, entitled "INTEGRATED ANTENNA AND FILTER UNIT (IAFU) FOR 5th GENERATION ADVANCED ANTENNA SYSTEM (AAS) SYSTEMS", which claimed priority to U.S. Provisional Application Ser. No. 62/833,987, filed Apr. 15, 2019, entitled "INTEGRATED ANTENNA AND FILTER UNIT (IAFU) FOR 5th GENERATION ADVANCED ANTENNA SYSTEM (AAS) SYSTEMS", the entireties of all of which are incorporated herein by reference.

TECHNICAL FIELD

Wireless communication and in particular, an integrated antenna and filter unit (IAFU).

BACKGROUND

To save weight and improve performance, antenna and filter units (AFUs) are incorporated in 4th generation (4G, also referred to as Long Term Evolution (LTE)) and 5th generation (5G, also referred to as New Radio) Advanced Antenna System (AAS) systems. In Frequency Division Duplex (FDD) systems, the Passive Intermodulation (PIM) performance of the AFU may have to meet stringent requirements due to the simultaneous transmit and receive functions for the system.

However, existing AFUs use separate filter and antenna modules with special cables and mechanical connectors between the modules to provide electrical communication. The mechanical connectors and cables used to connect the antenna module to the filter module are expensive and can be a significant source of PIM problems. Further, to achieve connection between the antenna and filter modules with many mechanical connectors, the structure of the antenna and filters modules may have to be very rigid, resulting in extra cost and weight.

SUMMARY

Some embodiments advantageously provide a method and system for an integrated antenna and filter unit (IAFU).

In one or more embodiments, the integrated antenna filter unit (IAFU) includes a filter unit that is connected to an antenna unit with a specific connection that has low PIM properties compared to existing systems. The connection may consist of an RF signal pin (i.e., conductor without a mechanical connector or a bare conductor) connected directly to the filter output and soldered onto a PCB containing a calibration network and antenna sub-array splitters. In other words, the electrical and/or communication connection between the antenna unit and the filter unit of the IAFU is achieved without mechanical connectors. In one or more embodiments, one of the layers of the PCB may also form the ground plane for the antennas. Antenna radiation walls may also be mounted on the PCB.

In one or more embodiments, the interconnect from the filter unit to the PCB that supports the antenna is designed to accept a special test connector for tuning the filter prior to soldering the filter unit to the PCB.

According to one aspect of the disclosure, an integrated antenna and filter unit for wireless communications is provided. The integrated antenna and filter unit includes a filter portion configured to receive radio frequency, RF, signals where the filter portion includes at least one filter configured to filter the RF signals to generate filtered RF signals, and a plurality of filter pins configured to output filtered RF signals. The integrated antenna and filter unit includes an antenna portion securable to the filter portion, the antenna portion including: a printed circuit board, PCB, including a plurality of conductor traces each mateable with a corresponding one of the plurality of filter pins to electrically couple the plurality of filter pins directly to corresponding ones of the plurality of conductor traces on the PCB and a plurality of antennas securable to the PCB, the plurality of antennas being electrically coupled to the plurality of conductor traces.

According to one or more embodiments, the filter portion includes a plurality of grounding pins, a respective pair of grounding pins of the plurality of grounding pins are grouped with a respective one of the plurality of filter pins. The PCB includes a plurality of grounding receptacles each mateable with a corresponding one of the plurality of grounding pins of the filter portion. According to one or more embodiments, the respective pair of grounding pins and respective filter pin are positioned along a logical plane with the respective filter pin positioned in between the respective pair of grounding pins. According to one or more embodiments, the integrated antenna and filter unit includes a plurality of semi-rigid electromagnetic, EM, shields disposed between the filter portion and the antenna portion where each semi-rigid EM shield is positioned along a perimeter surrounding a respective filter pin and respective pair of grounding pins.

According to one or more embodiments, the filter portion further includes a plurality of tuning elements configured to allow RF tuning of the filter portion. A plurality of test adapters are removably coupled to the plurality of filter pins to electrically isolate each of the plurality of filter pins during RF tuning, the plurality of test adapters outputting the tuned RF signals. According to one or more embodiments, the at least one filter is one of a cavity filter, resonator filter and ceramic waveguide filter. According to one or more embodiments, the plurality of filter pins are secured to the plurality of conductor traces by soldering each of the plurality of filter pins to the plurality of conductor traces.

According to one or more embodiments, the PCB includes an antenna calibration network for electrically coupling each of the plurality of filter pins to the plurality of antennas and combining signals from the plurality of filter pins for output to at least one output port. According to one or more embodiments, the electrical couplings from the filter portion to the antenna portion are performed without mechanical connectors. According to one or more embodiments, the filter portion is configured to physically support the antenna portion. According to one or more embodiments, the filter portion is configured to at least one of: output the filter RF signals to the antenna portion for transmission, and receive the RF signals from the antenna portion.

According to another aspect of the disclosure, a method for assembling an integrated antenna and filter unit for wireless communications is provided. A filter portion is secured to an antenna portion where the filter portion is configured to receive radio frequency, RF, signals, and where the filter portion includes: at least one filter configured to filter the RF signals to generate filtered RF signals and a plurality of filter pins configured to output filtered RF signals, and where the antenna portion securable to the filter portion, and where the antenna portion includes a printed circuit board, PCB, including a plurality of conductor traces each mateable with a corresponding one of the plurality of filter pins to electrically couple the plurality of filter pins directly to corresponding ones of the plurality of conductor traces on the PCB. A plurality of antennas are secured to the PCB, the plurality of antennas being electrically coupled to the plurality of conductor traces.

According to one or more embodiments, the filter portion includes a plurality of grounding pins where a respective pair of grounding pins of the plurality of grounding pins is grouped with a respective one of the plurality of filter pins. The PCB includes a plurality of grounding receptacles each mateable with a corresponding one of the plurality of grounding pins of the filter portion. According to one or more embodiments, the respective pair of grounding pins and respective filter pin are positioned along a logical plane with the respective filter pin positioned in between the respective pair of grounding pins. According to one or more embodiments, a plurality of semi-rigid electromagnetic, EM, shields are disposed between the filter portion and the antenna portion where each semi-rigid EM shield is positioned along a perimeter surrounding a respective filter pin and respective pair of grounding pins.

According to one or more embodiments, the filter portion further includes a plurality of tuning elements configured to allow RF tuning of the filter portion. Before securing the filter portion to the antenna portion, a plurality of test adapters are removably coupled to the plurality of filter pins to electrically isolate [nm1: the test adapter is to connect the test equipment to the filters for tuning purposes not to electrically isolate them] each of the plurality of filter pins during RF tuning and where the plurality of test adapters output the tuned RF signals. According to one or more embodiments, the at least one filter is one of a cavity filter, resonator filter and ceramic waveguide filter. According to one or more embodiments, the plurality of filter pins are secured to the plurality of conductor traces by soldering each of the plurality of filter pins to the plurality of conductor traces.

According to one or more embodiments, the PCB includes an antenna calibration network for electrically coupling each of the plurality of filter pins to the plurality of antennas and combining signals from the plurality of filter pins for output to at least one output port. According to one or more embodiments, the electrical couplings from the filter portion to the antenna portion are performed without mechanical connectors. According to one or more embodiments, the filter portion is configured to physically support the antenna portion. According to one or more embodiments, the filter portion is configured to at least one of: output the filter RF signals to the antenna portion for transmission, and receive the RF signals from the antenna portion.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
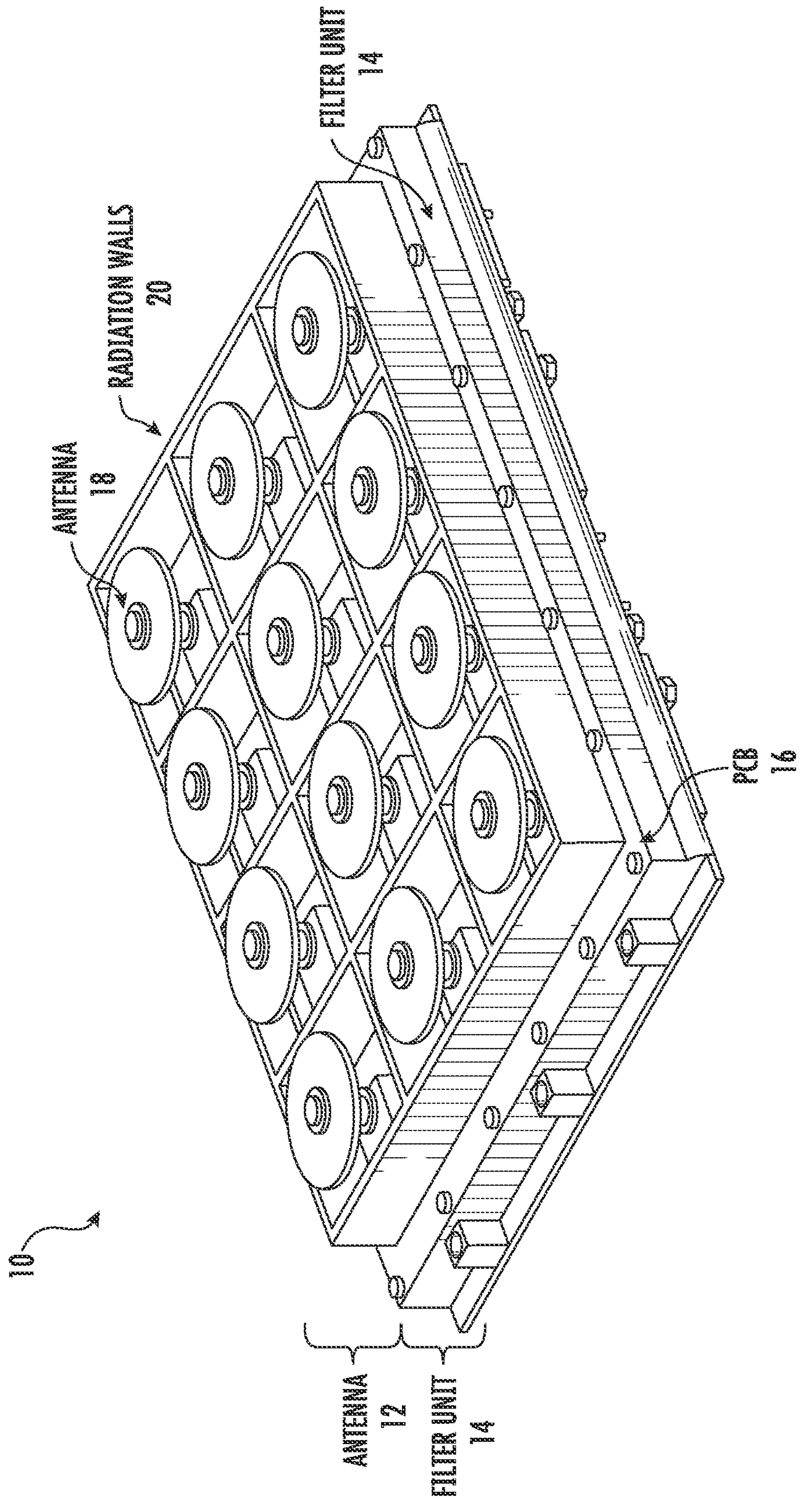
FIG. 1 is a perspective view of an integrated antenna and filter unit (IAFU) in accordance with the principles of the disclosure.

As discussed herein, the integrated antenna filter unit (IAFU) provides several advantages for advanced antenna systems (AAS) apparatuses. Some of these advantages include:

1) With the integration of the filter unit and antenna unit at least some aspects of the mechanical structure serve dual purposes for mechanical support, shielding, and antenna ground plane that may result in lower weight for the overall IAFU when compared to existing AFU.
2) The integration of the filter unit and antenna unit with the connector-less interface, i.e., no mechanical connectors at interface, may improve the PIM performance of the overall IAFU as mechanical connectors may be a significant source of PIM which may degrade system performance.
3) The return loss performance benefits derived from jointly optimizing and tuning the overall IAFU as well as removal of the loss associated with mechanical connectors may help improve the efficiency of the IAFU.
4) The integration of the filter unit and antenna unit may help at least reduce the cost by removing duplication and mechanical connectors.

Before describing in detail exemplary embodiments, it is noted that the embodiments reside primarily in apparatus components and/or steps related to an integrated antenna and filter unit (IAFU). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein Like numbers refer to like elements throughout the description.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising,” “includes”

and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), integrated access and backhaul (IAB) node, evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, Third Generation Partnership Project (3GPP) Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide an integrated antenna and filter unit (IAFU or integrated AFU).

Referring now to the drawing figures, in which like elements are referred to by like reference numerals, there is shown in FIG. 1 a diagram of an integrated antenna and filter unit (IAFU 10). IAFU 10 includes antenna unit 12 and filter unit 14. Antenna unit 12 includes PCB 16 (i.e., antenna PCB) that is described in further detail in FIG. 5. One or more antennas 18 may be in electrical communication with PCB 16. In one or more embodiments, the antennas 18 are connected to the PCB 16 by soldering antenna conductors to PCB 16. Walls 20, i.e., antenna radiation walls, may be removably connected and/or capacitively coupled and/or soldered to PCB 16. In one or more embodiments, the antenna unit 12, i.e., antenna portions, includes a plurality of walls 20, i.e., antenna radiation walls, securable to the PCB 16 where each wall 20 is positioned along a perimeter surrounding a respective antenna 18. In one or more embodiments, the plurality of walls 20 are arranged to reduce coupling between antennas 18 and alter a radiation pattern of each antenna 18. In other words, the IAFU 10 includes a filter unit 14 connected to an antenna unit 12/PCB 16 with a low PIM soldered connection. In one or more embodiments, soldering may include soldering of one or more pins/conductors to one or more receptacles. Further, in one or more embodiments, soldering, as described herein, may reduce vibrations and PIM compared to the use of mechanical connector that are used in existing system to connect a conductor. In one or more embodiments, IAFU 10 is part of or co-located with a network node and/or radio network node such as to provide network node and/or radio network node functionality.

In one or more embodiments, antennas 18 with walls 20 on PCB 16 is shown in FIG. 1 where the specific details of the antennas 18 and walls 20 are beyond the scope of this disclosure.

Figure 2:
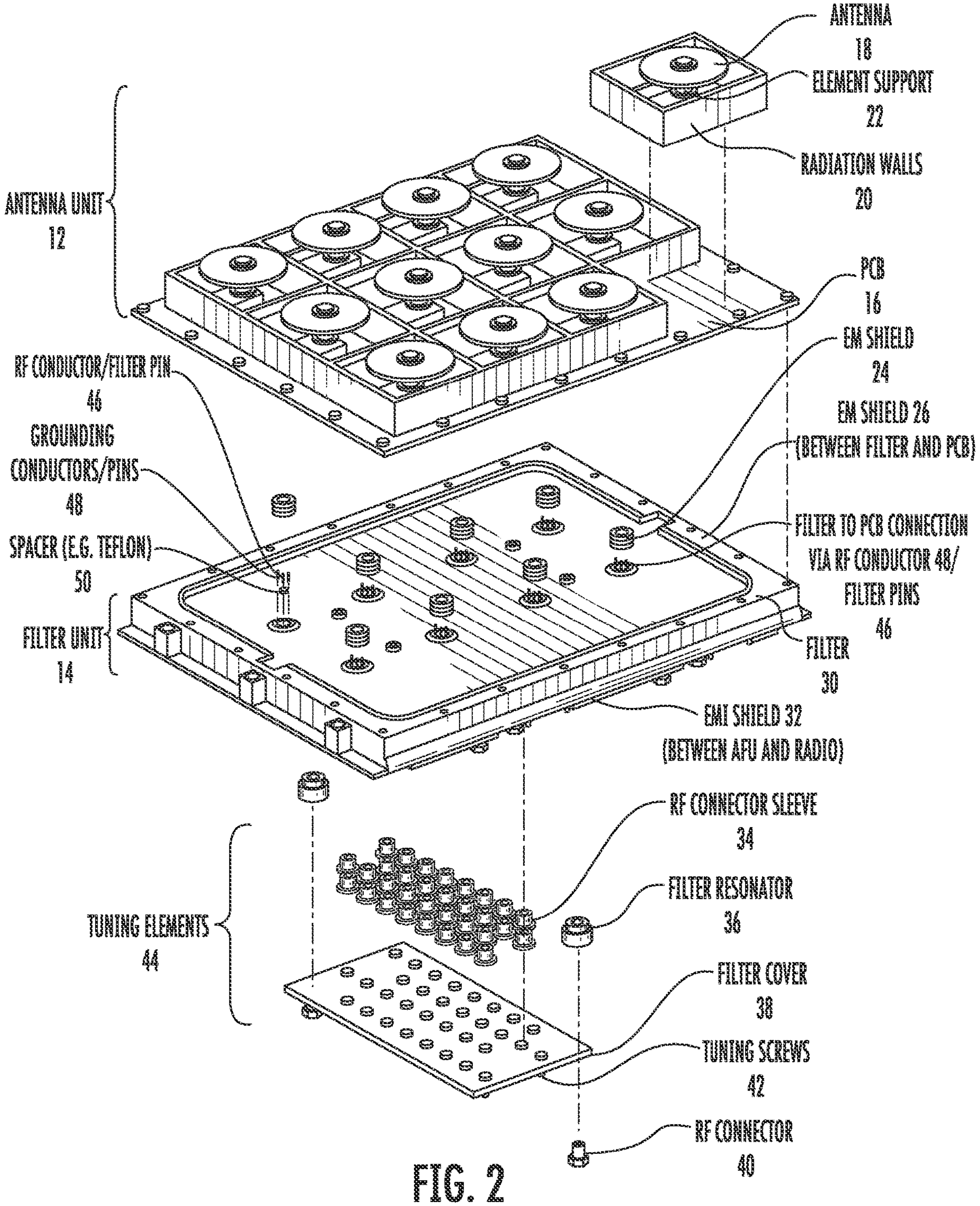
FIG. 2 is an exploded view of the IAFU in accordance with the principles of the disclosure.

FIG. 2 is an exploded view of IAFU 10 of FIG. 1 in accordance with one or more embodiments of the disclosure. Antenna unit 12 includes antenna 18 and walls 20 attached to PCB 16 where one or more antenna 18 may be supported by one or more element supports 22.

Filter unit 14 includes one or more EM shields 24. In one or more embodiments, the EM shields are semi-rigid and disposed between the filter portion/unit 14 and the antenna portion/unit 12 where each semi-rigid EM shield 24 is positioned along a perimeter surrounding a respective RF conductor 46 and grounding conductor pair 48. In one or more embodiments, RF conductor 46 may be a pin which may be referred to herein as filter pin 46. In one or more embodiments, grounding conductor 48 may be a pin which may be referred herein as grounding pin 48.

In one or more embodiments, filter unit 14 includes another EM shield 26 between the filter unit 14 and PCB 16 for helping prevent coupling, i.e., unwanted coupling that causes interference, between the filter unit 14 and PCB 16. Filter unit 14 may include one or more filters 30. The at least one filter 30 may include one or more of a cavity filter, resonator filter and ceramic waveguide filter, among other filter types known in the art. In one or more embodiments, filter unit 14 includes EM shield 32 between the IAFU 10 and one or more radios (not shown) to help reduce coupling, i.e., unwanted coupling, between the filter unit 14 and the one or more radios.

Filter unit 14 includes one or more tuning elements 44 configured to allow RF tuning of the filter portion. For example, in one or more embodiments, a plurality of test adapters (illustrated in FIG. 6) are removably coupled to the plurality of RF conductors 46 (e.g., filter pins 46) to electrically connect each of the plurality of RF conductors 46 to test equipment during RF tuning where the plurality of test adapters output the tuned RF signals. The tuning elements 44, i.e., tuning portion, may include one or more RF connector sleeves 34, one or more filter resonators 36, one or more filter covers 38, one or more RF connectors 40 and one or more tuning screws 42.

In one or more embodiments, the filter unit 14 includes a plurality of grounding conductors 48 (e.g., grounding pins 48) where each grounding conductor 48 (e.g., grounding pin 48) is paired with one of the plurality of RF conductors 46, and where the PCB 16 includes a plurality of grounding receptacles (illustrated in FIG. 5) each mateable with a corresponding one of the plurality of grounding conductor 48. Mateable as used herein may refer to two entities, objects, parts, connectors (e.g., male connector, female connector) etc., that are configured to be mated together. In one or more embodiments, each grounding receptacle may be in electrical communication with a PCB ground and/or common electrical ground. In one or more embodiments, one or more spacers 50 may be included where the spacers may be made from TEFLON. In one or more embodiments, the RF conductors 46 (e.g., filter pins 46) are configured to receive one or more signals from one or more radios where these signals are first filtered by one or more filters 30. The RF conductors 46 may then communicate the various RF signals to antenna unit 12 for transmissions. In one or more embodiments, IAFU may receive signals via antennas 18 such that the RF signals are passed to filter unit 14. For example, the signals may be received from wireless devices and/or network nodes (such as via a wireless backhaul for example).

In one or more embodiments, after the antennas 18 are soldered to the PCB 16, the PCB 16 is positioned to accept filter unit 14. For example, in one or more embodiments, PCB 16 includes various vias/receptacles that accept one or more RF conductors 46 and/or grounding conductors 48. In the example of FIG. 2, conductors/pins 46 and 48 are then spot soldered to PCB 16. The walls 20 may be mounted, afterwards, on the PCB 16 using plastic, i.e., polymer, screws or plastic rivets and/or other plastic fasteners. In one or more embodiments, the walls 20 are capacitively coupled to the antenna ground plane and there is no metal to metal contact with the ground plane to help prevent PIM. In one or more embodiments, filter unit 14 physically supports the antenna unit 12.

In one or more embodiments, an integrated antenna and filter unit (IAFU) 10 for wireless communications is provided. The integrated antenna and filter unit 10 includes a filter portion 14 (also referred to herein as filter unit 14 such that the terms are used interchangeably herein) configured to receive radio frequency, RF, signals such as from wireless devices and/or network nodes. The filter portion 14 includes at least one filter 30 configured to filter the RF signals to generate filtered RF signals. The filter portion 14 includes a plurality of RF conductors 46 (e.g., filter pins 46) where the plurality of RF conductors 46 are configured to output filtered RF signals. The IAFU 10 includes an antenna portion (also referred to as antenna unit 12 herein such that the terms are used interchangeably herein) securable to the filter portion 14. The antenna portion 12 includes a printed circuit board, PCB, 16 including a plurality of conductor traces that are each mateable with a corresponding one of the plurality of RF conductors 46 to electrically couple the plurality of RF conductors 46 to corresponding ones of the plurality of conductor traces on the PCB 16. The antenna portion 12 includes a plurality of antennas 18 securable to the PCB 16 where the plurality of antennas 18 are electrically coupled to the plurality of conductor traces.

In one or more embodiments, the filter portion 14 includes a plurality of grounding conductors 48 (e.g., grounding pins 48) where each grounding conductor 48 is paired with one of the plurality of RF conductors 46. The PCB 16 includes a plurality of grounding receptacles (e.g., PCB vias, through holes, etc., in electrical communication with electrical ground) that are each mateable with a corresponding one of the plurality of grounding conductor 48. In one or more embodiments, a plurality of semi-rigid electromagnetic, EM, shields 24 are disposed between the filter portion and the antenna portion where each semi-rigid EM shield 24 is positioned along a perimeter surrounding a respective RF conductor 46 and grounding conductor pair 48. In one or more embodiments, the EM shield 24 is an electromagnetic interference shield.

In one or more embodiments, the antenna portion 12 includes a plurality of walls 20 securable to the PCB 16 where each wall 20 is positioned along a perimeter surrounding a respective antenna 18. In one or more embodiments, the plurality of walls 20 are arranged to reduce coupling between antennas 18 and alter a radiation pattern of each antenna 18 and/or antenna element 19. In one or more embodiments, the filter portion 14 further includes a plurality of tuning elements 44 configured to allow RF tuning of the filter portion 14. A plurality of test adapters 56 are removably coupled to the plurality of RF conductors 46 to electrically isolate each of the plurality of RF conductors 46 (e.g., filter pins 46) during RF tuning where the plurality of test adapters 56 output the tuned RF signals.

In one or more embodiments, the at least one filter 30 is one of a cavity filter, resonator filter and ceramic waveguide filter. In one or more embodiments, the plurality of RF conductors 46 are secured to the plurality of conductor traces by soldering each of the plurality of RF conductors 46 to the plurality of conductor traces. In one or more embodiments, the PCB 16 includes an antenna calibration network 52 for electrically coupling each of the plurality of RF conductors 46 and then combining the signals to one output port that is connected to the radio for antenna calibration. In one or more embodiments, the electrical couplings from the filter portion 14 to the antenna portion 12 are performed without mechanical connectors.

Figure 3:
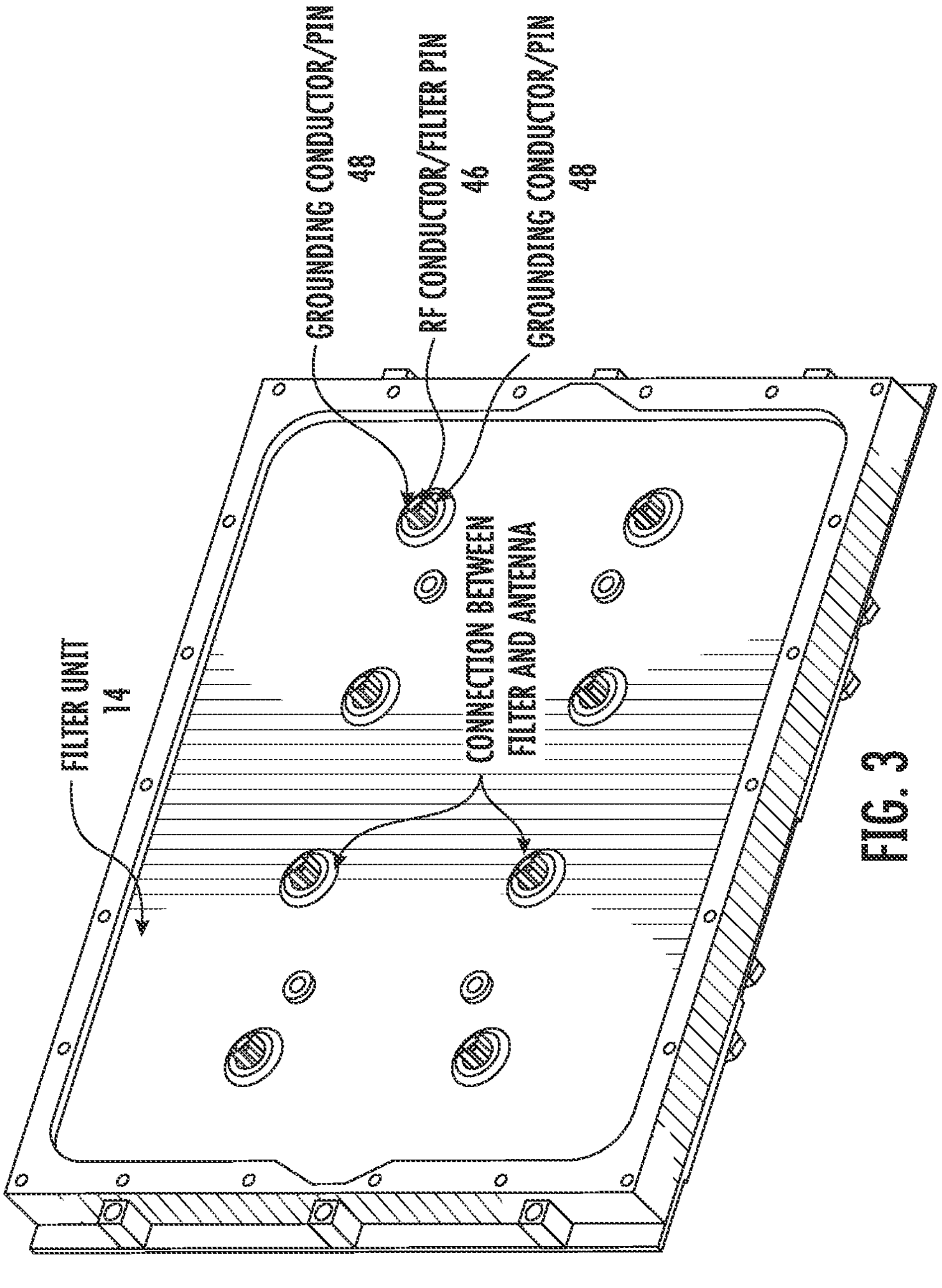
FIG. 3 is a partial view of a filter unit in accordance with the principles of the disclosure.

FIG. 3 is a partial view of filter unit 14 illustrating the various pairings of grounding conductors 48 and RF conductor 46. In one or more embodiments, each filter 30 is associated with at least a respective RF conductor 46 and, in some embodiments, one or more grounding conductors 48

(e.g., grounding pins 48). The filter unit 14 illustrated in FIG. 3 may, for example, support eight filters 30.

Figure 4:
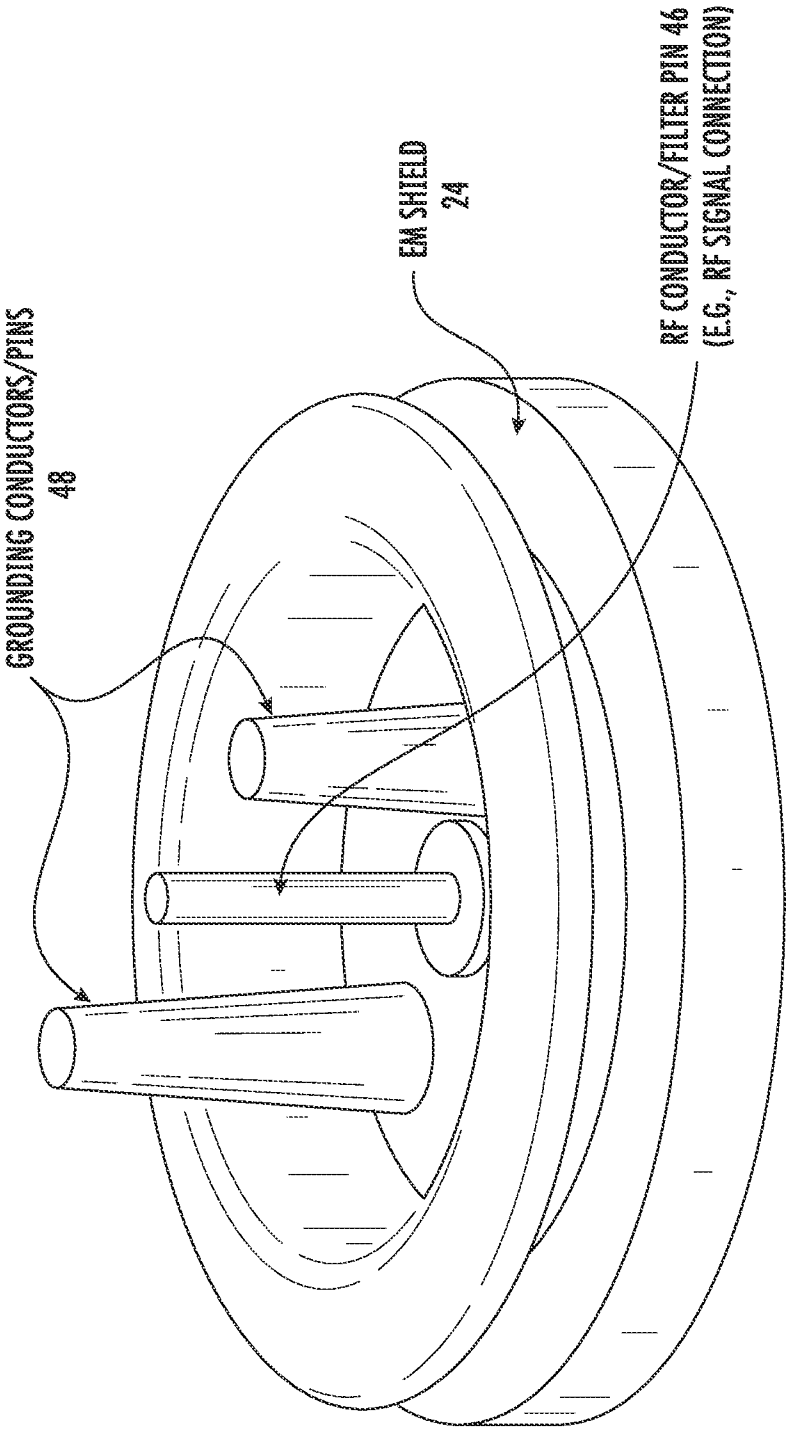
FIG. 4 is a perspective view of conductors of filter unit in accordance with the principles of the disclosure.

The details of the connection between antenna unit 12 and filter 14 using conductors are illustrated in FIG. 4. The grounding conductors 48 are press-fitted into the chassis of the filter unit 14. The RF conductor (i.e., center conductor or RF signal pin or filter pin) 46 is soldered directly to the output of the filter 30 of filter unit 14. An EM shield 24 surrounds conductors/pins 46 and 48 to help prevent coupling between different transmit/receive branches and/or other signal conductors/pins 46.

Figure 5:
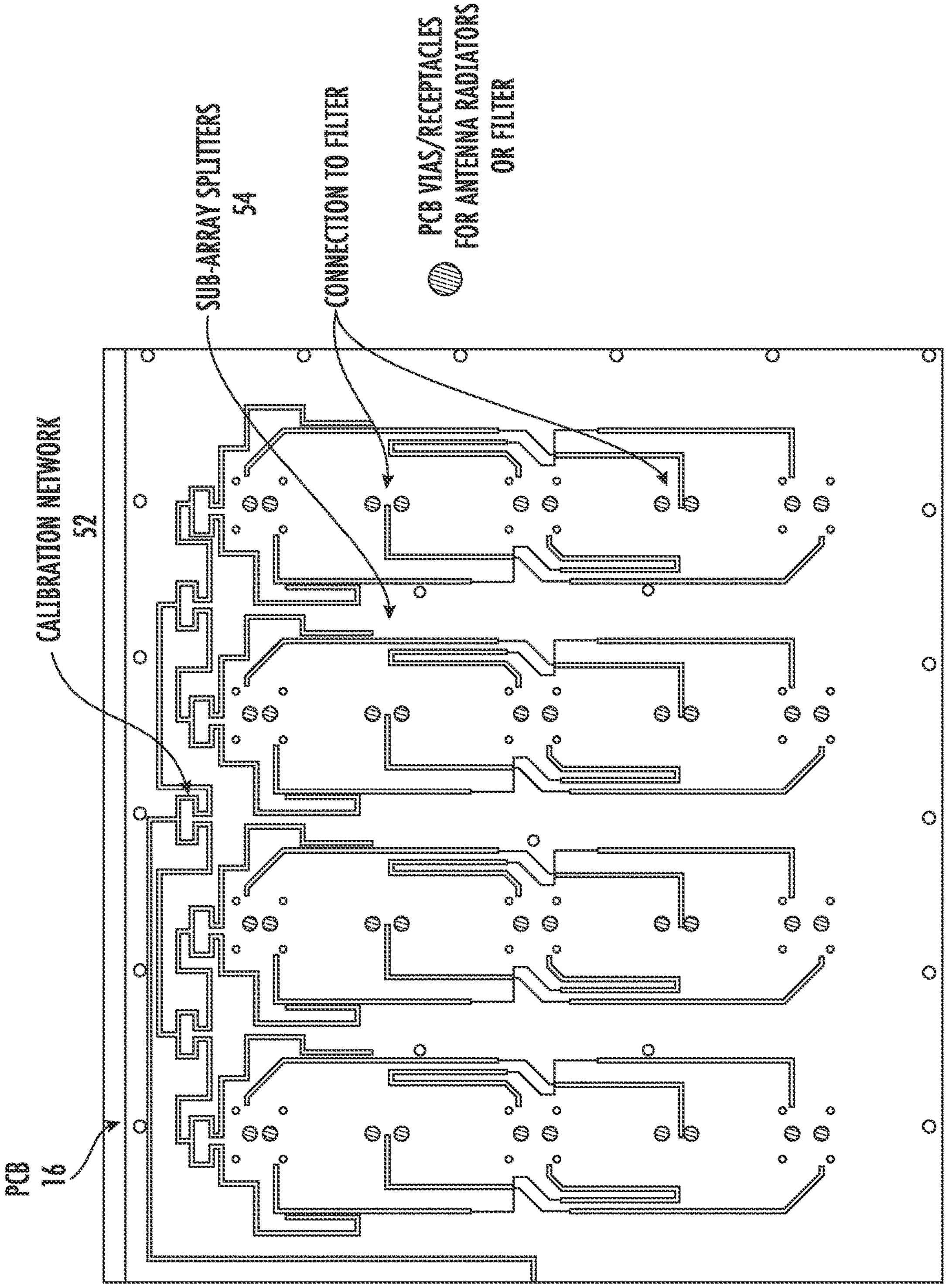
FIG. 5 is a view of the printed circuit board (PCB) of antenna unit in accordance with the principles of the disclosure.

In some embodiments, the PCB 16 contains an antenna calibration network 52 implemented in stripline with via shielding between the traces to help reduce coupling between the traces. In one or more embodiments, the PCB 16 may also contain the antenna sub-array splitters 54. An example of a PCB layout of PCB 16 is shown in FIG. 5. In one or more embodiments, the plurality of RF conductors 46 are secured to the plurality of conductor traces by soldering each of the plurality of RF conductors 46 to the plurality of conductor traces. In one or more embodiments, PCB 16 includes two splitters such as per antenna element.

Figure 6:
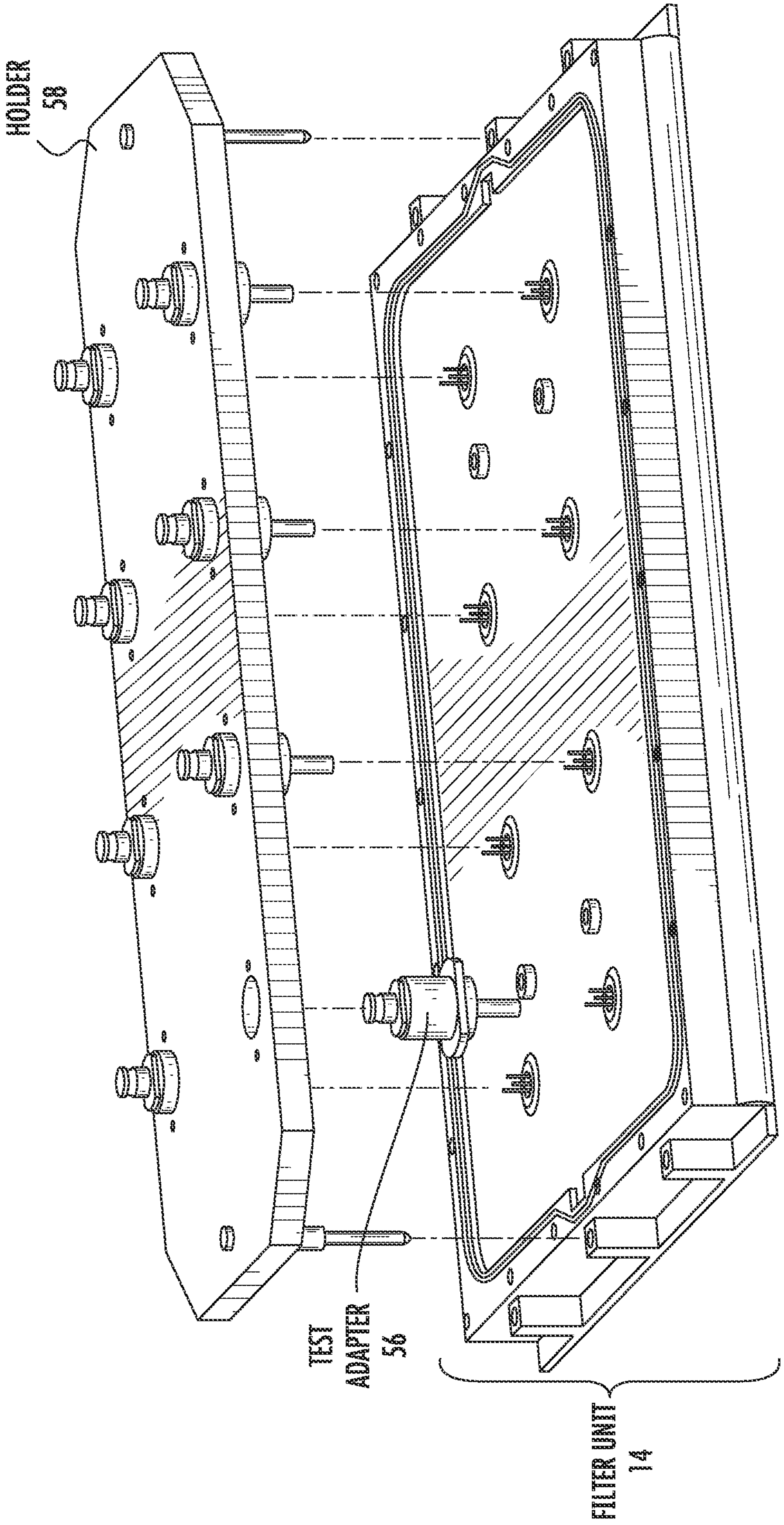
FIG. 6 is a perspective view of filter unit with corresponding test adapters in accordance with the principles of the disclosure.

The connection from the filter unit 14 can accept a test adapter 56, i.e., specific connector, to tune the filter response, as illustrated in FIG. 6. The filter unit 14 is tuned before the PCB 16 is connected and soldered to the filter unit 14. Additional tuning may be performed to improve the return loss after assembly of the IAFU 10. The tuning target for the filter unit 14 may take into account the design impedance of the antenna unit 12 of the IAFU 10. In one or more embodiments, the filter unit 14 is tuned by inputting one or more RF signals into filter unit 14, which are output as filtered signals to test adapters 56. The test adapters 56 may then be connected to a spectrum analyzer or other analysis device for RF tuning via tuning screws 42, for example. During testing shown in FIG. 6 may be the only instance where mechanical connectors, i.e., test adapters 56, and cables are used in IAFU 10. Once tuning has been performed, the one or more test adapters 56 and one or more holders 58 are removed, and the filter unit 14 may be secured to antenna unit 12 as described above.

Therefore, the IAFU 10 advantageously provides improvements in at least one of weight reduction, PIM reduction and improved efficiency over existing integrated antenna and filter units for use in 4G, 5G AAS and/or other third generation partnership project (3GPP) based radio apparatuses by, for example, removing duplication, eliminating mechanical connectors and providing joint optimization.

Figure 7:
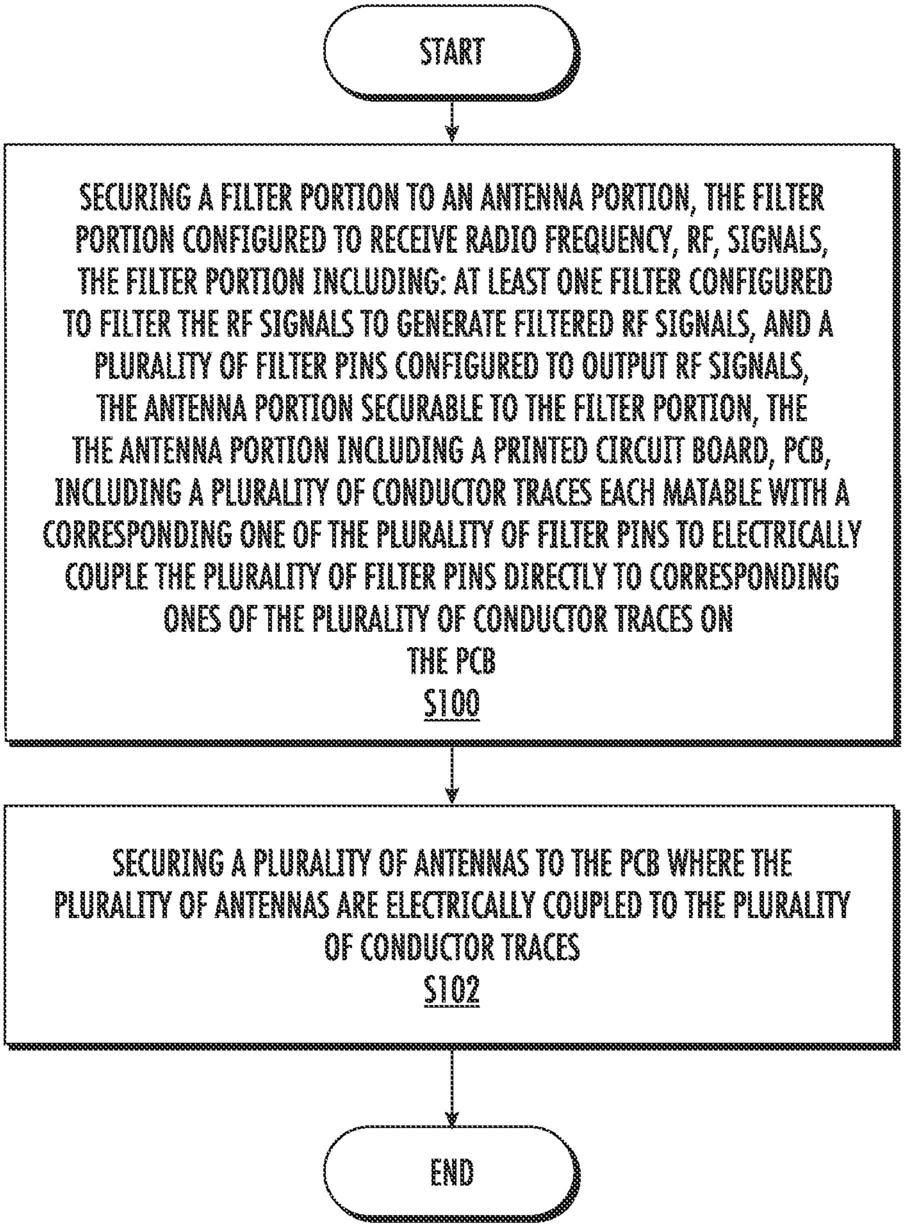
FIG. 7 is a flow diagram for assembling at least a portion of the IAFU in accordance with the principles of the disclosure.

FIG. 7 is a flowchart of an example process of assembling at least a portion of the IAFU 10 in accordance with the principles of the disclosure. In one or more embodiments, a filter portion 14 is secured (Block S100) to an antenna portion, the filter portion configured to receive radio frequency, RF, signals, the filter portion including: at least one filter configured to filter the RF signals to generate filtered RF signals, and a plurality of filter pins (i.e., an example of RF conductors 46) configured to output filtered RF signals; the antenna portion securable to the filter portion, the antenna portion including a printed circuit board, PCB, including a plurality of conductor traces each mateable with a corresponding one of the plurality of filter pins (i.e., an example of RF conductors 46) to electrically couple the plurality of filter pins directly to corresponding ones of the plurality of conductor traces on the PCB, as described herein. In one or more embodiments, a plurality of antenna 18 are secured to the PCB 16 where the plurality of antenna 18 are electrically coupled to the plurality of conductor traces. In one or more embodiments, a plurality of antennas 18 are secured (Block S102) to the PCB 16 where the plurality of antennas 18 are electrically coupled to the plurality of conductor traces. In one or more embodiments, Blocks S100 and S102 involve soldering the filter unit 14 and the antenna unit 12 together as described herein. In one or more embodiments, the soldering is performed by one or more machines, manufacturing machines, etc. that are known in the art.

In one or more embodiments, the filter portion 14 includes a plurality of grounding conductors 48 (e.g., grounding pins 48) where each grounding conductor 48 (e.g., grounding pins 48) is paired with one of the plurality of RF conductors 46 (e.g., filter pins 46). The PCB 16 includes a plurality of grounding receptacles each mateable with a corresponding one of the plurality of grounding conductor 48. In one or more embodiments, the respective pair of grounding conductor 48 (e.g., grounding pins 48) and respective RF conductors 46 (e.g., filter pin 46) are positioned along a logical plane with the respective RF conductor (e.g., filter pin 46) positioned in between the respective pair of grounding conductors 48 (e.g., grounding pins 48). In one or more embodiments, a plurality of semi-rigid electromagnetic, EM, shields 24 are disposed between the filter portion 14 and the antenna portion 12, each semi-rigid electromagnetic (EM) shield 24 is positioned along a perimeter surrounding a respective RF conductor 46 (e.g., filter pins 46) and grounding conductor pair 48 (e.g., grounding pin pair 48).

In one or more embodiments, a plurality of walls 20 are secured to the PCB 16, each wall 20 is positioned along a perimeter surrounding a respective antenna 18. In one or more embodiments, the plurality of walls 20 are arranged to reduce coupling between antenna 18 and alter a radiation pattern of each antenna 18. In one or more embodiments, the filter portion 14 further includes a plurality of tuning elements 44 configured to allow RF tuning of the filter portion 14. Before securing the filter portion 14 to the antenna portion 12, a plurality of test adapters 56 are removably coupled to the plurality of RF conductors 46 (e.g., filter pins 46) to electrically isolate each of the plurality of RF conductors 46 (e.g., filter pins 46) during RF tuning. The plurality of test adapters 56 output the tuned RF signals. In one or more embodiments, the at least one filter 30 is one of a cavity filter, resonator filter and ceramic waveguide filter. In one or more embodiments, the plurality of RF conductors 46 (e.g., filter pins 46) are secured to the plurality of conductor traces by soldering each of the plurality of RF conductors 46 (e.g., filter pins 46) to the plurality of conductor traces. In one or more embodiments, the PCB 16 includes an antenna calibration network 52 for electrically coupling each of the plurality of RF conductors 46 to the plurality of antenna 18 and combining signals from the plurality of RF conductors 46 (e.g., filter pins 46) for output to at least one output port. In one or more embodiments, the electrical couplings from the filter portion 14 to the antenna portions 12 are performed without mechanical connectors. According to one or more embodiments, the filter portion 14 is configured to physically support the antenna portion 12. According to one or more embodiments, the filter portion 14 is configured to at least one of: output the filter RF signals to the antenna portion 12 for transmission, and receive the RF signals from the antenna portion 12.

EXAMPLES

Example 1. An integrated antenna and filter unit 10 for wireless communications, the integrated antenna and filter unit 10 comprising:

a filter portion 14 configured to receive radio frequency, RF, signals, the filter portion 14 including:

at least one filter configured to filter the RF signals to generate filtered RF signals; and a plurality of RF conductors (e.g., filter pins) 46, the plurality of RF conductors 46 configured to output filtered RF signals;

an antenna portion 12 securable to the filter portion 14, the antenna portion 12 including:

a printed circuit board 16, PCB 16, including a plurality of conductor traces each mateable with a corresponding one of the plurality of RF conductors 46 to electrically couple the plurality of RF conductors 46 to corresponding ones of the plurality of conductor traces on the PCB 16;

a plurality of antennas 18 securable to the PCB 16, the plurality of antennas 18 being electrically coupled to the plurality of conductor traces.

Example 2. The integrated antenna and filter unit 10 of Example 1, wherein the filter portion 14 includes a plurality of grounding conductors 48 (e.g., grounding pins 48), each grounding conductor 48 being paired with one of the plurality of RF conductors 46; and the PCB 16 including a plurality of grounding receptacles each mateable with a corresponding one of the plurality of grounding conductor of the filter portion 14.

Example 3. The integrated antenna and filter unit 10 of Example 2, further comprising a plurality of semi-rigid electromagnetic, EM, shields disposed between the filter portion 14 and the antenna portion 12, each semi-rigid EM shield being positioned along a perimeter surrounding a respective RF conductor 46 and grounding conductor 48 pair.

Example 4. The integrated antenna and filter unit 10 of Example 1, wherein the antenna portion 12 includes a plurality of walls securable to the PCB 16, each wall being positioned along a perimeter surrounding a respective antenna 18.

Example 5. The integrated antenna and filter unit 10 of Example 4, wherein the plurality of walls are arranged to reduce coupling between antennas and alter a radiation pattern of each antenna 18.

Example 6. The integrated antenna and filter unit 10 of Example 1, wherein the filter portion 14 further includes a plurality of tuning elements 44 configured to allow RF tuning of the filter portion 14; and a plurality of test adapters 56 being removably coupled to the plurality of RF conductors 46 to electrically isolate each of the plurality of RF conductors 46 during RF tuning, the plurality of test adapters 56 outputting the tuned RF signals.

Example 7. The integrated antenna and filter unit 10 of Example 1, wherein the at least one filter is one of a cavity filter, resonator filter and ceramic waveguide filter.

Example 8. The integrated antenna and filter unit 10 of Example 1, wherein the plurality of RF conductors 46 are secured to the plurality of conductor traces by soldering each of the plurality of RF conductors 46 to the plurality of conductor traces.

Example 9. The integrated antenna and filter unit 10 of Example 1, wherein the PCB 16 includes an antenna calibration network for electrically coupling each of the plurality of RF conductors 46 to the plurality of antennas 18.

Example 10. The integrated antenna and filter unit 10 of Example 1, wherein the electrical couplings from the filter portion 14 to the antenna portion 12 are performed without mechanical connectors.

Example 11. A method for assembling an integrated antenna and filter unit 10 for wireless communications, the method comprising:

securing a filter portion 14 to an antenna portion 12, the filter portion configured to receive radio frequency, RF, signals, the filter portion 14 including at least one filter configured to filter the RF signals to generate filtered RF signals and a plurality of RF conductors 46 (e.g., filter pins 46) configured to output filtered RF signals, the antenna portion 12 including a printed circuit board 16, PCB 16, including a plurality of conductor traces each mateable with a corresponding one of the plurality of RF conductors 46 to electrically couple the plurality of RF conductors 46 to corresponding ones of the plurality of conductor traces on the PCB 16;

securing a plurality of antennas 18 to the PCB 16, the plurality of antennas 18 being electrically coupled to the plurality of conductor traces.

Example 12. The method of Example 11, wherein the filter portion 14 includes a plurality of grounding conductors 48 (e.g., grounding pins 48), each grounding conductor 48 being paired with one of the plurality of RF conductors 46; and the PCB 16 including a plurality of grounding receptacles each mateable with a corresponding one of the plurality of grounding conductors 48 of the filter portion 14.

Example 13. The method of Example 12, further comprising disposing a plurality of semi-rigid electromagnetic, EM, shields 24 between the filter portion 14 and the antenna portion 12, each semi-rigid electromagnetic (EM) shield 24 being positioned along a perimeter surrounding a respective RF conductor 46 and grounding conductor 48 pair.

Example 14. The method of Example 10, further comprising securing a plurality of walls to the PCB, each wall being positioned along a perimeter surrounding a respective antenna.

Example 15. The method of Example 14, wherein the plurality of walls are arranged to reduce coupling between antennas and alter a radiation pattern of each antenna.

Example 16. The method of Example 10, wherein the filter portion 14 further includes a plurality of tuning elements 44 configured to allow RF tuning of the filter portion 14; and the method further comprising, before securing the filter portion 14 to the antenna portion 12, removably coupling a plurality of test adapters 56 to the plurality of RF conductors 46 to electrically isolate each of the plurality of RF conductors 46 during RF tuning, the plurality of test adapters 56 outputting the tuned RF signals.

Example 17. The method of Example 10, wherein the at least one filter is one of a cavity filter, resonator filter and ceramic waveguide filter.

Example 18. The method of Example 10, wherein the plurality of RF conductors 46 are secured to the plurality of conductor traces by soldering each of the plurality of RF conductors 46 to the plurality of conductor traces.

Example 19. The method of Example 10, wherein the PCB 16 includes an antenna calibration network for electrically coupling each of the plurality of RF conductors 46 to the plurality of antennas 18.

Example 20. The method of Example 10, wherein the electrical couplings from the filter portion 14 to the antenna portion 12 are performed without mechanical connectors.

As will be appreciated by one of skill in the art, the concepts described herein may be embodied as a method and units, i.e., apparatuses. Accordingly, the concepts described herein may take the form of an entirely hardware embodiment, or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, at least a portion of the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and units.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

FDD Frequency Division Duplex

TDD Time Domain Duplex

AAS Advanced Antenna Systems

WCDMA Wideband Code Division Multiple Access

AFU Antenna Filter Unit

PIM Passive Intermodulation

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A grounding apparatus, comprising:

a plurality of grounding conductors, each of the plurality of grounding conductors being paired with a corresponding one of a plurality of radio frequency (RF) conductors; and a plurality of grounding receptacles, each of the plurality of grounding receptacles being configured to mate with a corresponding one of the plurality of grounding conductors, and each grounding receptacle being in communication with an electrical ground, each grounding conductor of the plurality of grounding conductors including a pair of grounding pins, each RF conductor of the plurality of RF conductors including an RF pin, each respective pair of grounding pins being paired with a corresponding RF pin.

2. The grounding apparatus of claim 1, wherein each respective pair of grounding pins and the corresponding RF pin are disposed along a same plane, with the corresponding RF pin being positioned in between the respective pair of grounding pins.

3. The grounding apparatus of claim 2, further comprising a plurality of electromagnetic (EM) shields, each EM shield being positioned to surround the respective pair of grounding pins and the corresponding RF pin.

4. The grounding apparatus of claim 1, wherein:

the plurality of grounding conductors and the plurality of RF conductors are disposed in a first RF unit; and the plurality of grounding receptacles are disposed in a second RF unit, the first unit and the second RF unit being configured to communicate RF signals via respective RF conductors.

5. The grounding apparatus of claim 4, wherein the second RF unit includes a printed circuit board (PCB), and the plurality of grounding receptacles are disposed on the PCB.

6. The grounding apparatus of claim 5, wherein the PCB includes a ground plane providing the electrical ground.

7. The grounding apparatus of claim 5, wherein each of the plurality of grounding conductors includes a via or a through hole.

8. The grounding apparatus of claim 4, wherein each grounding conductor of the plurality of grounding conductors includes a pair of grounding pins and each RF conductor of the plurality of RF conductors includes an RF pin, each respective pair of grounding pins being paired with a corresponding RF pin, and each respective pair of grounding pins and the corresponding RF pin being disposed in the second RF unit.

9. The grounding apparatus of claim 8, wherein each respective pair of grounding pins and the corresponding RF pin are disposed along a same plane, with the corresponding RF pin being positioned in between the respective pair of grounding pins.

10. The grounding apparatus of claim 9, further comprising a plurality of electromagnetic (EM) shields disposed between the first RF unit and the second RF unit, each EM shield being positioned to surround the respective pair of grounding pins and the corresponding RF pin.

11. The grounding apparatus of claim 4, wherein:

the first RF unit is a filter unit, the filter unit being configured to output filtered RF signals via the respective RF conductors; and the second RF unit is an antenna unit configured to receive the filtered RF signals via the respective RF conductors.

12. A method for assembling a grounding apparatus, comprising:

pairing a plurality of grounding conductors and a plurality of radio frequency (RF) conductors such that each of the plurality of grounding conductors is paired with a corresponding one of the plurality of RF conductors; and configuring a plurality of grounding receptacles such that (i) each of the plurality of grounding receptacles is configured to mate with a corresponding one of the plurality of grounding conductors, and (ii) each grounding receptacle is in communication with an electrical ground, each grounding conductor of the plurality of grounding conductors including a pair of grounding pins, each RF conductor of the plurality of RF conductors including an RF pin, each respective pair of grounding pins being paired with a corresponding RF pin.

13. The method for assembling a grounding apparatus of claim 12, further comprising:

disposing each respective pair of grounding pins and the corresponding RF pin along a same plane; and positioning the corresponding RF pin in between the respective pair of grounding pins.

14. The method for assembling a grounding apparatus of claim 12, wherein:

the plurality of grounding conductors and the plurality of RF conductors are disposed in a first RF unit; and the plurality of grounding receptacles are disposed in a second RF unit, the first unit and the second RF unit being configured to communicate RF signals via respective RF conductors.

15. The method for assembling a grounding apparatus of claim 14, wherein the second RF unit includes a printed circuit board (PCB), the plurality of grounding receptacles being disposed on the PCB.

16. The method for assembling a grounding apparatus of claim 15, wherein the PCB includes a ground plane providing the electrical ground.

17. The method for assembling a grounding apparatus of claim 14, wherein each grounding conductor of the plurality of grounding conductors includes a pair of grounding pins and each RF conductor of the plurality of RF conductors includes an RF pin, each respective pair of grounding pins being paired with a corresponding RF pin, and each respective pair of grounding pins and the corresponding RF pin being disposed in the second RF unit.

18. The method for assembling a grounding apparatus of claim 17, further comprising:

disposing a plurality of electromagnetic (EM) shields between the first RF unit and the second RF unit, each EM shield being positioned to surround the respective pair of grounding pins and the corresponding RF pin.

* * * * *